March 20, 1928.
M. B. LONG
1,663,086
MEANS FOR INDICATING FREQUENCY CHANGES
Filed March 4, 1924
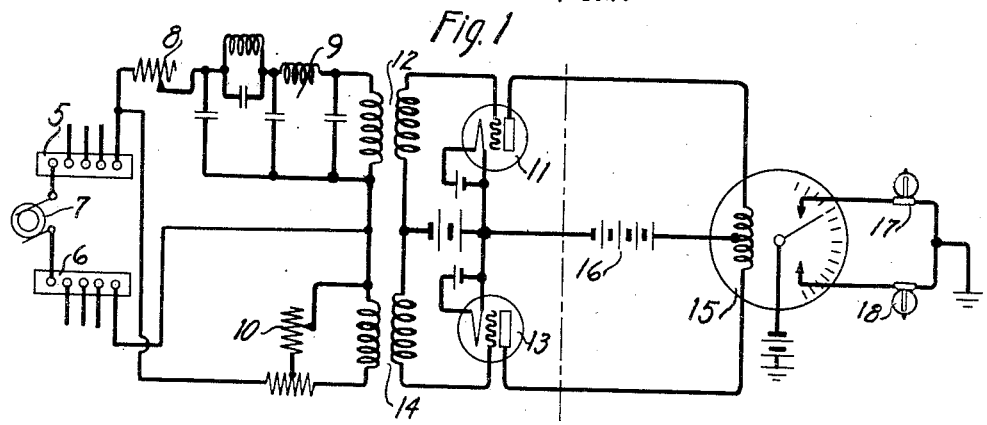
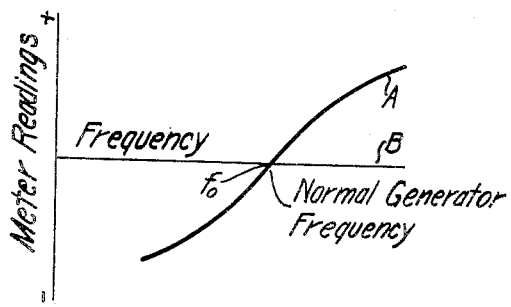
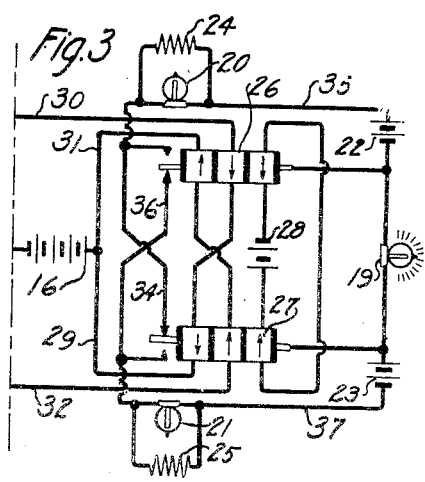
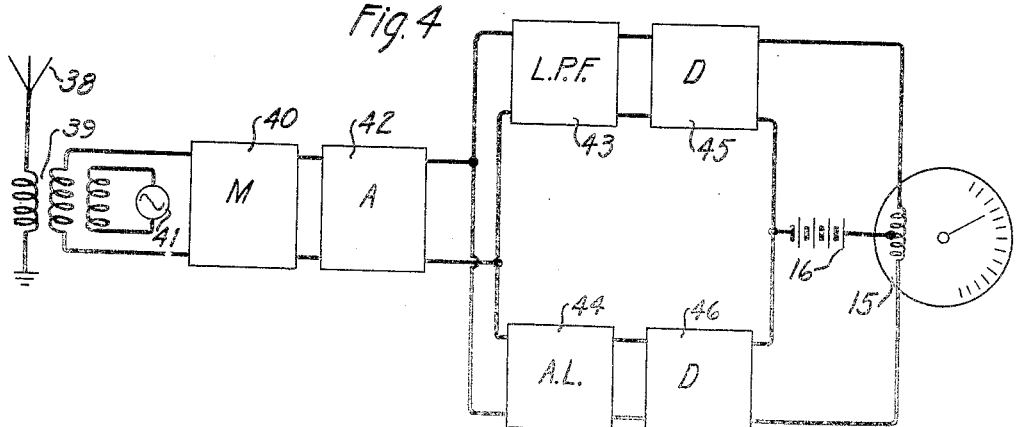
Inventor:
Maurice B. Long
by E. W. Adams Atty.

Patented Mar. 20, 1928.

1,663,086

UNITED STATES PATENT OFFICE.

MAURICE B. LONG, OF GLEN RIDGE, NEW JERSEY, ASSIGNOR TO WESTERN ELECTRIC COMPANY, INCORPORATED, OF NEW YORK, N. Y., A CORPORATION OF NEW YORK.

MEANS FOR INDICATING FREQUENCY CHANGES.

Application filed March 4, 1924. Serial No. 696,772.

This invention relates to means for indicating frequency changes.

An object of the invention is to indicate with accuracy and precision, small changes in the frequency generated by a source of alternating current.

A related object of the invention is to devise a simple frequency indicating system which is reliable in operation, giving a positive indication of small frequency changes.

It is frequently desirable in connection with alternating current generators or other sources of alternating current to keep the frequency constant, and for this purpose it is desirable that any changes in frequency be indicated in a reliable manner. This invention provides means for instantly and accurately indicating comparatively small changes in the frequency of a source of alternating current.

In accordance with a feature of the invention, a part of the energy generated by a source of alternating current is transmitted through two networks which are so adjusted that the outputs of the networks will be equal at one, and only one, frequency.

At least one of these networks has a characteristic such that a large change in attenuation occurs for a small change in frequency. The other network may also have an attenuation which varies with the frequency but in the preferred form of the invention the second network has an attenuation which is substantially independent of the frequency.

Since the outputs of the two networks are equal at only one frequency, any increase or decrease in the frequency above or below this critical point will result in an unbalance between the outputs of the networks, such unbalance becoming greater as the change in frequency becomes greater.

The alternating current components transmitted by the two networks are rectified and balanced against each other by means of sensitive indicating devices, the deflection of which indicates an increase or decrease in the normal frequency of the generator.

The novel features which characterize the invention are set forth in the appended claims. The invention itself, however, both as to its organization and method of operation, together with its various features and advantages will be apparent from the following description taken in connection with the accompanying drawing, in which, Fig. 1 is a diagrammatic illustration of a system embodying the invention.

Fig. 2 is a curve illustrating the operation of the system of Fig. 1.

Fig. 3 is a diagrammatic illustration of a monitoring lamp circuit adapted to be used in connection with the system of Fig. 1.

Fig. 4 is a diagrammatic illustration of a modified system embodying the invention.

Referring to Fig. 1, a pair of bus-bars 5 and 6 are connected to the poles of an alternating current generator or other suitable source of alternating current 7.

A filter 9 is connected to the bus-bars through an adjustable resistance 8, and a balancing resistance or artificial line 10 is similarly connected to the bus-bars in parallel with the filter 9.

The filter 9 is of a general type well known in the art, having characteristics such that it will transmit with substantially negligible attenuation a band of frequencies of definite width while sharply attenuating frequencies lying without the band. This filter may be of the wave filter type described in part 3 of an article on the "Theory and design of uniform and composite electric wave-filters," by Otto J. Zobel, in the Bell System Technical Journal of January, 1923. Such filters contain in general a plurality of sections having series and shunt reactances designed, according to well known laws, for the range of frequencies of the current which the filters are to transmit. The filter 9 is preferably a low pass filter designed to pass currents of frequencies below a given cut-off frequency and to greatly attenuate currents of higher frequencies.

A pair of rectifiers are connected in circuit with the filter 9 and artificial line 10 for rectifying the alternating current energy transmitted therethrough. Any suitable rectifiers may be employed, such as detectors of the type commonly used in radio transmission, or if desired, thermo-couples may be used in place of rectifiers.

Two balanced detectors 11 and 13 of the highly evacuated three element electron discharge type are illustrated, the detector 11 being coupled to the output of the filter 9 by means of a transformer 12 and the detector 13 being coupled to the output of the artificial line 10 by means of a transformer 14.

The detectors 11 and 13 are connected in a balanced circuit where the gain is kept equal for each, the anodes of the detectors being connected to the ends of the winding of a sensitive galvanometer 15 in such a manner that the rectified energy from one detector opposes the rectified energy from the other detector.

Space current is supplied to detectors 11 and 13 by means of a battery 16 connected to the mid-point of the winding of the galvanometer 15. The galvanometer 15 is provided with a suitable dial and a needle adapted to move over the face of the dial when the opposing currents in the galvanometer become unbalanced. A pair of indicating lamps 17 and 18 may also be provided, the circuits of these lamps being closed by the galvanometer needle when shifted a given distance from the normal position.

The artificial line 10 may be adjusted so that its output current will balance the output current of the filter 9 for any one given frequency within that range of frequencies for which a slight frequency change occasions a large change in the attenuation occasioned by the artificial line 10. This range for a particular filter is comparatively narrow and lies between that portion of its transmission band at which attenuations are practically constant with frequency and the band or range of frequencies beyond the cut-off point which may be termed an "excluded band." The impedance characteristic of a broad band filter in this intermediate range between its "transmission band" and an "excluded band" may, with apparatus which is practicable from a commercial standpoint, be made considerably steeper than the impedance characteristic of a simple selective circuit commonly known as a "tuned circuit." This is for the reason that the impedance characteristic of a broad band filter throughout this range is dependent far more upon the reactances of the network and to a much less degree upon resistance than is the case with a simple tuned circuit.

Fig. 2 shows a characteristic curve illustrating the operation of the system, the meter readings being plotted against frequency. It will be seen from Fig. 2 that the galvanometer registers zero at only one frequency, namely, the critical frequency $fo$. This is due to the fact that, as pointed out above, the artificial line 10 is so adjusted that the components transmitted through the filter 9 and artificial line 10 are equal at a given normal generator frequency, and that consequently the outputs of the detectors 11 and 13 are equal at that frequency.

As the frequency falls below the critical frequency $fo$, the attenuation of the low pass filter 9 decreases very rapidly so that the output of the filter increases in proportion as indicated by curve A in the figure. When, however, the frequency of the current generated by the source 7 becomes higher than the critical frequency $fo$, the attenuation of the filter 9 increases very rapidly.

Since the artificial line 10 has an attenuation which is substantially independent of the frequency, the current component transmitted therethrough is not differently attenuated in consequence of a change in frequency, as indicated by the horizontal line B in Fig. 2.

Hence, if the generator 7 is generating a frequency $fo$, the alternating current impressed upon the detectors 11 and 13 will be equal, and equal direct current E. M. F.'s will be produced in their output circuits. In this case, since the circuit is so arranged that the two E. M. F.'s will oppose each other, the needle of the galvanometer 15 will stand in its intermediate or zero position.

If the frequency of the generator 7 increases, the attenuation of the filter 9 will be increased, and consequently the E. M. F. on the output side of the detector 11 will be decreased so that a resultant current will flow through the winding of the galvanometer 15 in such direction as to shift the needle to the minus side of the dial to close the circuit of the lamp 18.

On the other hand, if the frequency of the generator 7 decreases below the critical frequency $fo$, the attenuation of the filter 9 will be decreased so that a resultant direct current E. M. F. will be produced in the output circuit in the opposite direction, causing the needle of the galvanometer 15 to be shifted in the opposite direction to the plus side of the dial to close the circuit of the lamp 17.

The sensitive monitoring lamp circuit shown in Fig. 3 may be used in the system of Fig. 1 in place of the galvanometer 15 and associated indicating lamps 17 and 18. This monitoring circuit may be used to advantage where it is desired to give a constant and reliable visual indication of the condition of the system. For this purpose three lamps of distinctive colors are provided, only one of these lamps being lighted at one time.

A white lamp 19 is adapted to be lighted when the current generated by the source 7 is of normal frequency, a red lamp 20 being lighted when the frequency increases above the normal frequency, and a blue lamp 21 being lighted when the frequency falls below the normal frequency.

A pair of batteries 22 and 23 of equal potential are provided, each being capable of lighting a lamp to medium brightness. Resistances 24 and 25 in shunt of the lamps 20 and 21, respectively, are of a value in the neighborhood of the hot resistance of one of these lamps.

A pair of three-winding relays 26 and 27 are provided for controlling the energization of lamps 19, 20 and 21. The direction of current flow through each individual winding is always in the same direction, and the arrows on these relays indicate the direction in which each winding when energized tends to influence the relay armature. The right-hand winding of each relay is a biasing winding normally energized over a circuit extending from one side of battery 28, through right-hand windings of relays 26 and 27 to the other side of battery 28. As indicated by the arrows on these biasing windings, the relay 26 is biased toward the marking contact and the relay 27 toward the spacing contact.

The center and left-hand windings of relays 26 and 27 are equal windings carrying space current from each of the detectors 11 and 13.

Space current is supplied to the detector 11 from battery 16, through conductor 29, left-hand winding of relay 27, center winding of relay 26, conductor 30 to the anode of detector 11. Space current is supplied to the detector 13 from battery 16, through conductor 31, left-hand winding of relay 26, center winding of relay 27, conductor 32 to the anode of detector 13.

It will be evident that when the outputs of detectors 11 and 13 are equal, the current flow through the left-hand windings of relays 26 and 27 will equal the current flow through the center windings of these relays. In this case the effect of the current in the center and left-hand windings will be to neutralize each other and the armatures of these relays will be attracted by the energization of the right-hand biasing windings to the position shown in Fig. 3. When this condition prevails, the lamp 19 is lighted by the batteries 22 and 23 in multiple over a circuit extending from one side of battery 22, through lamp 19, armature and upper contact of relay 27, conductor 34, lamp 20 and resistance 24 in parallel, conductor 35 to the opposite side of battery 22, and is also energized over a circuit extending from one side of battery 23, through lamp 19, armature and lower contact of relay 26, conductor 36, lamp 21 and resistance 25 in parallel conductor 37, to the other side of battery 23. Since these circuits extend, respectively, through the lamps 20 and 21 and resistances 24 and 25 in parallel, the lamps 20 and 21 will not glow.

If the frequency of the generator 7 increases, the output of the detector 11 will decrease proportionately, as pointed out above, and consequently the current flowing through the center and left-hand windings of the relays 26 and 27 will become unbalanced, a smaller amount of current flowing through the center winding of relay 26 and left-hand winding of relay 27 than through the left-hand winding of relay 26 and center winding of relay 27. The upward pull on the armature of relay 26 exerted by the energization of the left-hand winding of relay 26 thus overcomes the downward pull on the armature exerted by the energization of the center winding, and the armature of this relay is therefore moved into engagement with its upper contact.

Similarly, the upward pull exerted on the armature of relay 27 by the energization of the center winding overcomes the downward pull exerted by the energization of the left-hand winding of this relay, but since the armature is already in engagement with its upper contact due to its being biased in that direction, the armature of this relay remains in the position shown in the drawing.

The white lamp 19 is therefore short-circuited and the red lamp 20 is energized over a circuit extending from one side of battery 22, through conductor 35, lamp 20, upper contact and armature of relay 26, to the other side of battery 22, thus indicating that the frequency of the generator 7 has increased above the normal critical frequency.

If, however, the frequency of the generator 7 decreases below the normal critical frequency the output of the detector 11 increases proportionately as described above, and the current flowing through the center winding of relay 26 and the left-hand winding of relay 27 becomes greater than the current flowing through the left-hand winding of relay 26 and center winding of relay 27. This causes the armature of relay 26 to engage its lower contact and also causes the armature of relay 27 to engage its lower contact. When this condition prevails, the blue lamp 21 is lighted over a circuit extending from one side of battery 23, through conductor 27, lamp 21, lower contact and armature of relay 27, to the other side of battery 23.

If the armature of one of the relays 26 or 27 remains between its upper and lower contacts for an appraciable time, due to a slow change in the frequency of the generator 7 and consequently in the output of the detector 11, the white lamp 19 will, nevertheless, be lighted to indicate that no appreciable change in frequency has yet taken place. For example, if the armature of relay 26 remains between its upper and lower contacts, the lamp 19 will still be energized over a circuit extending from one side of battery 22 through conductor 35, lamp 20 and resistance 24 in parallel, conductor 34, upper contact and armature of relay 27, lamp 19, to the other side of battery 22. In like manner, if the armature of relay 27 remains between its upper and lower contacts for an appreciable length of time, the lamp 19 will nevertheless be energized by the battery 23 over a circuit previously traced.

Fig. 4 illustrates the application of the invention to a radio signaling system. In this system, the antenna 38 is connected to ground in series with the primary winding of a transformer 39, the secondary of which is connected to the input of a balanced modulator 40. The waves impressed upon the antenna 38 are combined in the modulator 40 with a carrier wave generated by a suitable constant wave source 41 in circuit with the third winding of the transformer 39. The output of the modulator 40 is impressed upon an amplifier 42 which is connected to the input circuits of a low pass filter 43 and an artificial line 44 in parallel.

The filter 43 is connected to the input of a detector 45, and the artificial line 44 is connected to the input of a detector 46, these detectors being connected differentially to the winding of the galvanometer 15.

In one system of this type which has been operated successfully the normal frequency of the waves received by the antenna 38 was 610 kilocycles. In this system, if the frequency of the constant carrier source 41 is 594 kilocycles, the lower modulation component of 16,000 cycles will be impressed upon the amplifier 42, and a wave of 16,000 cycles is impressed upon the filter 43 and the artificial line 44.

So long as the frequency of the incoming wave is maintained at its normal critical frequency of 610 kilocycles, the output currents of the filter 43 and artificial line 44 will be equal and hence the direct current potentials produced by the detectors 45 and 46, being proportional to the amplitude of the waves transmitted through each network, will be equal.

If, however, the frequency of the waves impressed upon the antenna 38 increases, the frequency of the waves impressed upon the filter 43 and the artificial line 44 will increase correspondingly. The low pass filter 43 in this case is designed to greatly attenuate currents of frequencies above 16,000 cycles and hence, as the frequency of the current impressed upon the filter 43 increases above 16,000 cycles, less current will be impressed upon the detector 45, but as the artificial line 44 has an attenuation which is substantially independent of the frequency the current passing through the detector 46 will not be substantially attenuated. Consequently, the E. M. F. on the output side of the detector 45 will be lower than that on the output side of the detector 46 so that a resultant current will flow through the winding of galvanometer 15 in such a direction as to shift the galvanometer needle to the lower or plus side of the dial to indicate an increase in frequency.

On the other hand, if the frequency decreases, the attenuation of the filter 43 will be decreased so that a resultant direct E. M. F. will be produced in the output circuit in the opposite direction. In this case, the needle of the galvanometer 15 will be shifted to the upper or minus side of the dial to indicate a decrease in frequency. If desired, the monitoring lamp circuit of Fig. 3 may be used in connection with the system of Fig. 4.

The modulator 40 and constant carrier source 41 of the system shown in Fig. 4 are employed in order to convert the incoming high frequency wave into a proportional wave of lower frequency, since it would be difficult and expensive to design a low pass filter, such as 43, having a cut-off of 610 kilocycles. Such modulation, however, is not essential and, in fact, is not at all necessary when the waves impressed upon the antenna 38 are of a comparatively low frequency.

The invention has been shown and described in connection with certain preferred embodiments thereof, but it will be understood that it is capable of many other constructions and modifications widely differing from those herein shown and described, the scope of the invention being defined by the appended claims.

What is claimed is:

1. A frequency indicating system comprising a source of alternating current, a non-reactive transmission path and a low pass filter of the broad band type associated therewith, and an indicating instrument differentially connected to said resistance element and filter.

2. A system for indicating the frequency of waves from a source of alternating currents, comprising a pair of transmission channels, means for impressing a wave simultaneously thereon, a broad band wave filter in one of said channels, a network of substantially non-reactive elements in the other of said channels, and an indicating instrument associated with both of said channels and responsive to the difference of the output currents therefrom.

3. A frequency indicating system comprising a source of alternating current, a pair of networks associated therewith, one of said networks having an impedance which is substantially independent of frequency and the other of said networks adapted to pass with substantially negligible attenuation currents within a definite band of frequencies and to sharply attenuate currents lying to one side of said band, and an indicating instrument differentially associated with said networks.

4. A frequency indicating system comprising a source of alternating current, a pair of networks associated therewith, one of said networks having an impedance characteristic that is substantially independent of frequency and the other of said networks having a plurality of sections constituting a broad band filter such that a large change in attenuation is produced for a small change in frequency, means associated with each network for translating an alternating current wave into a direct current potential proportional to the amplitude of the alternating current wave, and an indicating instrument differentially connected to said last mentioned means.

5. A frequency indicating system in which a wave is impressed simultaneously upon a broad band wave filter and upon a network of substantially non-reactive impedance, and in which the intensities of the component waves after transmission through the respective networks are compared by means of a differential indicating instrument.

6. A system for indicating the frequency of waves from a source of alternating currents, comprising a pair of transmission channels, means for impressing a wave simultaneously thereon, one of said channels including a broad band wave filter, an indicating instrument differentially connected to the output terminals of both channels, and a substantially non-reactive impedance network in the other channel adapted to equalize the output currents of the two channels at a single predetermined frequency.

7. A system for indicating the frequency of waves from a source of alternating currents, comprising a pair of transmission channels, means for impressing a wave simultaneously thereon, a broad band wave filter in one of said channels, an indicating instrument differentially connected to the output terminals of said channels, and an adjustable non-reactive network in the other of said channels whereby the attenuation in the two channels may be equalized at one frequency.

8. A frequency indicating system comprising a pair of transmission channels, means for impressing a wave simultaneously thereon, a broad band wave filter and a detector in one of said channels, an indicating instrument differentially associated with both of said channels, and an adjustable non-reactive network and a detector in the other of said channels, whereby said instrument may be made to give zero indication at a single predetermined frequency.

In witness whereof, I hereunto subscribe my name this 29th day of February A. D., 1924.

MAURICE B. LONG.